United States Patent [19]
Haga et al.

[11] Patent Number: 5,178,249
[45] Date of Patent: Jan. 12, 1993

[54] ROTARY COUPLING FOR TORQUE TRANSMISSION

[75] Inventors: Kyosuke Haga, Anjo; Satoshi Ashida; Yukihiro Tanigawa, both of Toyota, all of Japan

[73] Assignees: Toyoda Koki Kabushiki Kaisha, Kariya; Toyota Jidosha Kabushiki Kaisha, Toyota, both of Japan

[21] Appl. No.: 813,690

[22] Filed: Dec. 27, 1991

[30] Foreign Application Priority Data

Dec. 27, 1990 [JP] Japan .................. 2-407994

[51] Int. Cl.⁵ .............. F16D 43/284; F16D 25/0638
[52] U.S. Cl. ........................ 192/35; 192/57; 192/85 AA; 192/103 F
[58] Field of Search ............ 192/35, 57, 58 B, 58 C, 192/85 AA, 103 F

[56] References Cited

U.S. PATENT DOCUMENTS

| | | | |
|---|---|---|---|
| 3,490,312 | 1/1970 | Seltz et al. | 192/103 F X |
| 4,905,808 | 3/1990 | Tomita et al. | 192/85 AA |
| 4,966,268 | 10/1990 | Asano et al. | 192/58 C |
| 5,012,908 | 5/1991 | Kobayashi et al. | 192/57 |
| 5,063,738 | 11/1991 | Asano et al. | 192/85 AA X |

FOREIGN PATENT DOCUMENTS

| | | | |
|---|---|---|---|
| 2-66329 | 5/1990 | Japan | 192/57 |
| 863917 | 9/1981 | U.S.S.R. | 192/58 B |

Primary Examiner—Richard Lorence
Attorney, Agent, or Firm—Oblon, Spivak, McClelland, Maier & Neustadt

[57] ABSTRACT

A rotary coupling for torque transmission is arranged between two relatively rotatable shafts to transmit a rotational torque in response to a rotational speed difference therebetween. The device includes a housing connected to the first shaft for rotation therewith, a clutch means for transmitting rotational torque between two shafts, and a piston which thrusts the clutch means in the axial direction. The rotary coupling also includes a rotor received in a cylindrical space, in which a high viscous fluid is filled to be compulsorily moved by the rotor. Each side surface of the rotor is provided with plural depressions at regular interval in the circumferential direction. The depressions have inclining surfaces inclining in the rotational direction of the rotor. When a rotational speed difference occurs between the two shafts, wedge effects occur between the inclined surfaces and the housing and between the inclined surface and the piston so that a high pressure is generated in the space section quickly.

11 Claims, 7 Drawing Sheets

ROTARY COUPLING FOR TORQUE TRANSMISSION

BACKGROUND OF THE INVENTION

1. Field of the Invention

The present invention relates to a rotary coupling for torque transmission in response to a rotational speed difference between two relatively rotatable shafts.

2. Discussion of the Prior Art

A rotary coupling for torque transmission between input/output shafts is disclosed in Japanese Laid-Open Patent Publication 63-240429. As illustrated in FIG. 1, the rotary coupling according to the conventional art has a housing 21 which receives in its space section 40 a rotor 41 having two or three blades 42a extending in a radial direction. Further a high viscous fluid 45 is filled in the space section 40 to constitute a pressure generating mechanism together with the rotor 41.

When a relative rotation occurs between the housing 21 and a rotary shaft 22, the high viscous fluid 45 filled in the space section 40 is compulsorily displaced by the blades 42a. An internal pressure proportional to the relative rotation is then generated in the space section 40, whereby a piston is slid in the axial direction so as to press clutch means. Consequently, the rotational torque is transmitted from the input shaft to the output shaft.

The above-mentioned pressure generating mechanism of a blade type contains air of a few volume percent in the space section in consideration of the thermal expansion of the high viscous fluid. The air contained in the space section does not affect the characteristic in the torque transmission under normal conditions. On the contrary, under the special conditions that the relative rotational direction of the blades abruptly changes during torque transmission, the transmissive torque might be decreased temporarily due to the air. The detailed phenomenon is as follows.

When the blades 42a rotate in the forward direction (that is the clockwise direction) relative to the housing 21 in response to a positive rotational speed difference N between the housing 21 and the rotary shaft 22, as shown in FIG. 1, the air is gathered to areas E1 located at backward side of the blades 42a with respect to the rotational direction of the blades 42a. However, when a negative rotational speed difference —N occurs abruptly and the blades 42a relatively rotate in a reverse direction (that is the counter clockwise direction), the air in the areas E1 is moved to areas E2 located at backward side of the blades 42a with respect to the rotational direction of the blades 42a. Since the air moves through a long distance from the areas E1 to E2, the pressure generated by the pressure generating mechanism tends to be relatively low during the movement of the air.

As a result when the rotational direction of the blades 42a changes abruptly, the transmissive torque is decreased temporarily as illustrated by L2 in FIG. 2 wherein a curve L1 shows the change of the transmissive torque with respect to rotational speed difference. The torque transmission is thus delayed in such case.

SUMMARY OF THE INVENTION

Accordingly, it is an object of the present invention to provide an improved rotary coupling which can generate a high pressure in response to a rotational speed difference between two relatively rotatable shafts.

It is another object of the present invention to provide an improved rotary coupling which can start torque transmission quickly even when the relative rotational direction of the rotor changes abruptly.

It is still another object of the present invention to provide an improved rotary coupling whose characteristic changes according to the rotational direction of the rotor.

Briefly, the improved rotary coupling according to the present invention comprises a housing coaxially arranged between first and second shafts and connected to the first shaft, clutch means received in the housing for transmitting rotational torque between the housing and the second shaft, a piston which is axially slidably received in the housing for thrusting the clutch means and defines a cylindrical space with the housing, a rotor received in the cylindrical space and coupled to the second shaft for rotational movement therewith, and a high viscous fluid filled in the cylindrical space to be displaced by the rotor to generate a pressure for pushing the piston toward the clutch means, wherein the rotor is provided with a plurality of circumferentially separated depressions which are formed in at least one surface facing the housing or the piston, and each of the depressions has at least one inclined surface inclining in the rotational direction of the rotor.

When the first shaft rotates faster than the second shaft, the rotor rotates relative to the housing and the piston in order to displace the high viscous fluid compulsorily in the cylindrical space. The rotor of the present invention is formed with a plurality of depressions which has an inclined surface inclining in the rotational direction so that wedge effects occur between the inclined surfaces, and the housing and/or the piston, thereby generating high pressure quickly in the space section.

As explained above, in the present invention, transmission of rotational torque is started in a short time after the occurrence of a rotational speed difference between the first and second shafts, while the clutch means is prevented from wear which would occur due to slide friction in a long time.

BRIEF DESCRIPTION OF THE ACCOMPANYING DRAWINGS

Various other objects, features and many of the attendant advantages of the present invention will be readily appreciated as the same becomes better understood by reference to the following detailed description of the preferred embodiments when considered in connection with the accompanying drawings, in which.

DETAILED DESCRIPTION OF THE PREFERRED EMBODIMENTS

Figure 1:
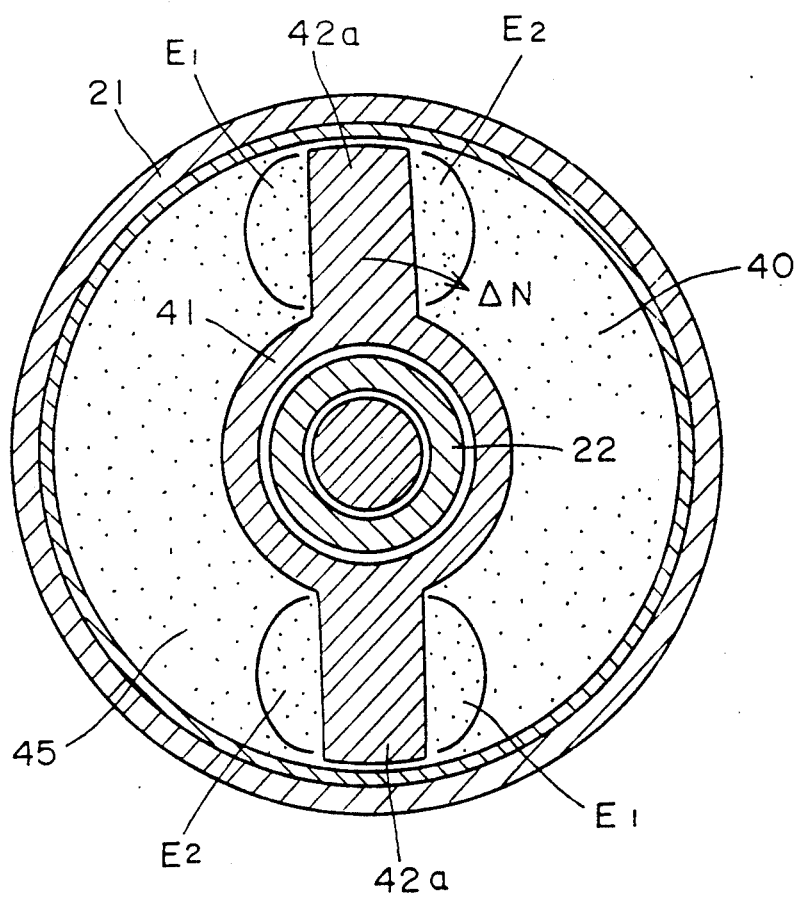
FIG. 1 is an explanatory view illustrating the movement of a high viscous fluid in a rotary coupling according to the prior art.
Figure 2:
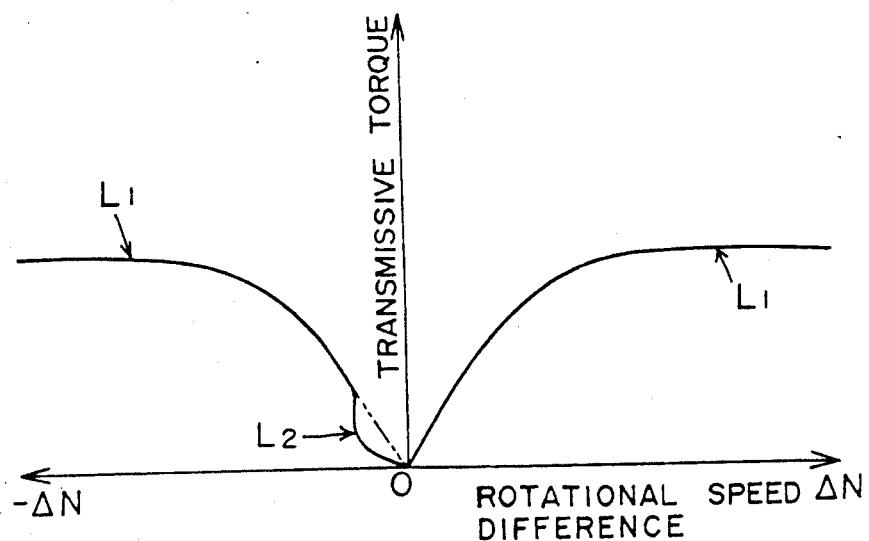
FIG. 2 is a graph which shows the relationship between transmissive torque and rotational speed difference in the rotary coupling according to the prior art.
Figure 3:
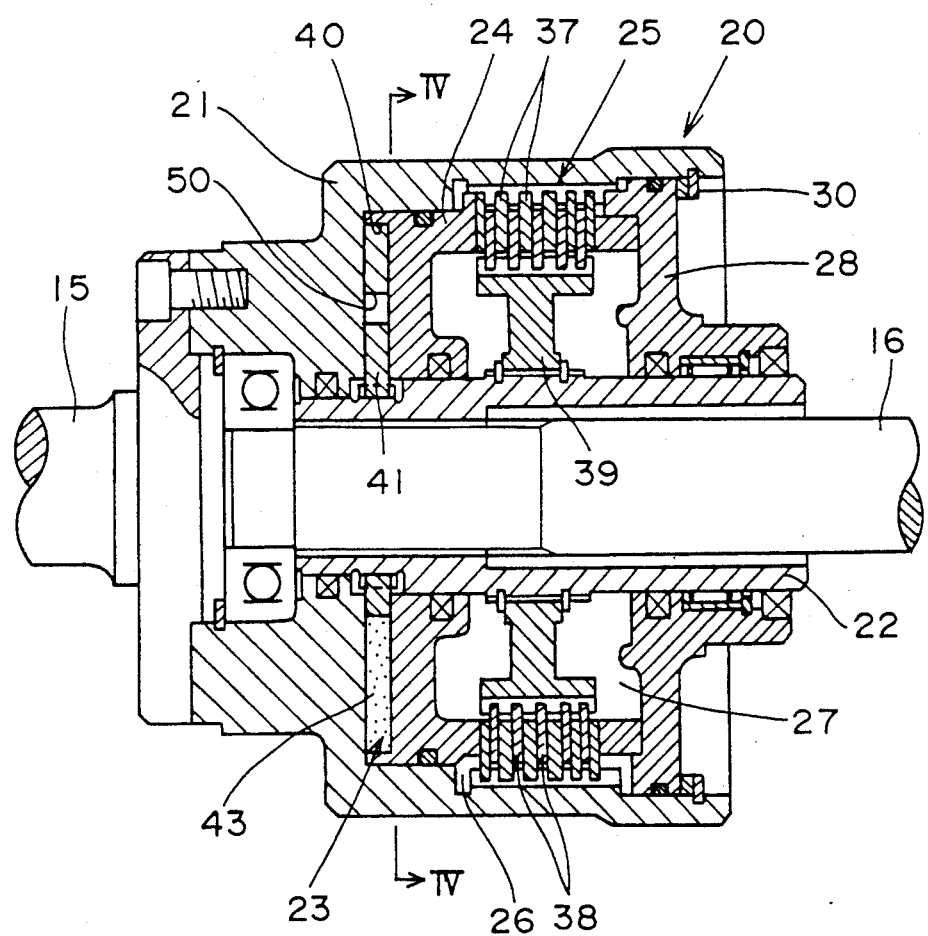
FIG. 3 is a sectional view of a rotary coupling for torque transmission according to an embodiment of the present invention.
Figure 4:
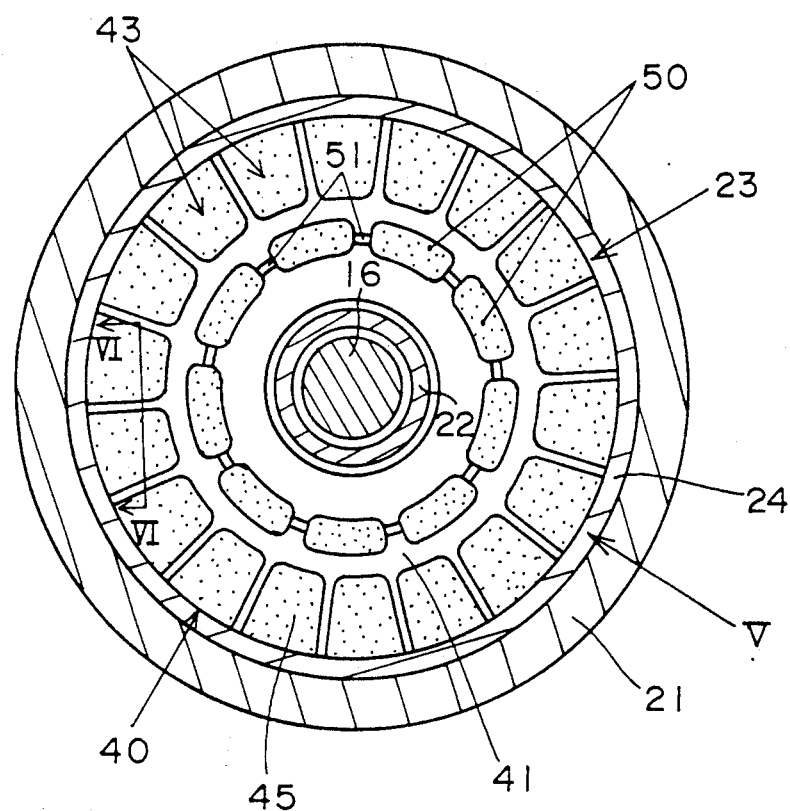
FIG. 4 is a sectional view taken along line IV—IV in FIG. 3.

Referring now to the drawings, FIG. 3 shows a rotary coupling 20 disposed between a first shaft 15 and a second shaft 16 (front and rear wheel axles, or right and left wheel axles) which are relatively rotatable to each other. The rotary coupling 20 is mainly composed of a housing 21, a rotary shaft 22 penetrating the housing 21 in the axial direction in order to be rotatably supported therein, a pressure generating mechanism 23 generating a pressure in proportion to a rotational speed difference between the housing 21 and the rotary shaft 22, a piston 24 to which the pressure generated by the pressure generating mechanism 23 is applied, and clutch means 25 which is frictionally engageable by a thrust force from the piston 24.

The first shaft 15 is connected to one end of said housing 21 for rotation therewith, while the second shaft 16 is spline-engaged with the inner peripheral surface of the rotary shaft 22. In the housing 21, a cylindrical hollow chamber 26 having a bottom surface is formed in order to receive said piston 24 for slide movement therein with a predetermined clearance between the piston 24 and the bottom surface. The piston 24 is spline-engaged with the inside surface of the housing 21 in order to be rotated therewith.

Between the bottom surface of the housing 21 and the end surface of the piston 24, a cylindrical space section 4 is formed so as to slidably receive a rotor 41 having a thickness slightly smaller than the axial width of the space section 40. The rotor 41 is spline-engaged at its center portion with the outer peripheral surface of the rotary shaft 22.

Figure 5:
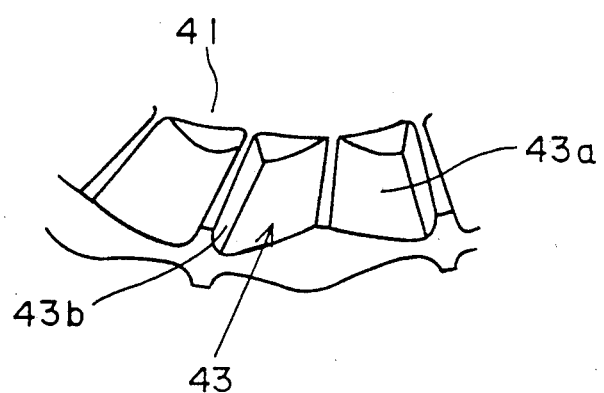
FIG. 5 is an enlarged view of the portion V of the rotor shown in FIG. 4.
Figure 6:
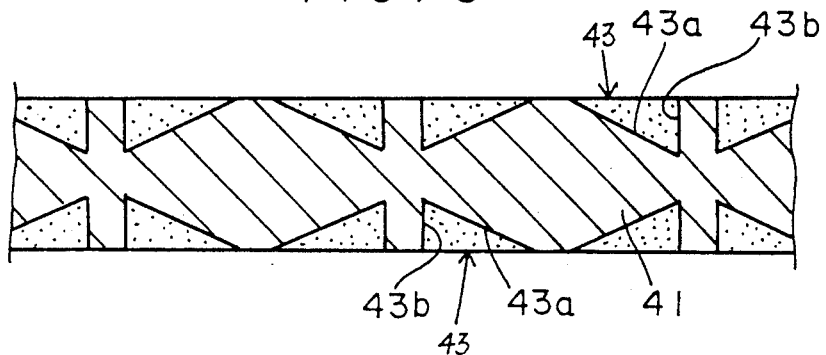
FIG. 6 is a sectional view taken along line VI—VI in FIG. 4.

Each of the two side surfaces of the rotor 41 is provided with plural depressions 43 formed at a regular interval in the circumferential direction. The depressions 43, as illustrated in FIGS. 5 and 6, have inclined bottom surfaces 43a inclining in the rotational direction of the rotor 41 and side surfaces 43b. One of every two adjacent inclined bottom surfaces faces the forward rotational direction of the rotor 41, while the other thereof faces the reverse rotational direction. Both of the two adjacent inclined surfaces have the same length or width in the circumferential direction and the same gradient angle. Each of the depressions 43 is filled with high viscous fluid 45 such as silicon oil. When a relative rotation occurs between the housing 21, which is spline-engaged with the piston 24, and the rotor 41, the high viscous fluid 45 filled in the depressions 43 is compulsorily moved by the inclined bottom surfaces 43a and the side surfaces 43b at a speed corresponding to the rotational speed difference. Under such circumstance wedge effects are produced between the inclined bottom surfaces 43a and the bottom surface of the housing 21, and between the inclined bottom surfaces 43a and the piston 24, resulting in increasing the pressure generated in the space section 40 effectively.

The rotor 41 is further provided with a plurality of holes 50 penetrating the rotor 41 in a direction parallel to the rotational axis of the rotor 41. The holes 50 are formed with a predetermined angular interval in the circumferential direction, and are located at radial locations closer to the rotational axis of the rotor 41 than the depressions 43. Each of both side surfaces of the rotor 41 is also provided with plural grooves 51 extending in the circumferential direction to connect the holes 50. Since the holes 50 are filled with the high viscous fluid 45, the total volume of the high viscous fluid filled in the space section 40 is sufficient to generate a predetermined pressure. The high viscous fluid is equally filled in the holes 50 because all of the holes 50 are connected through the grooves 51. When a relative rotation occurs between the housing 21 and the rotor 41, the high viscous fluid 45 in the holes 50 is moved outwardly in the radial direction by centrifugal force through side clearances between the bottom surface of the housing 21 and the rotor 41, and between the piston 24 and the rotor 41 so that the high viscous fluid is moved to the depressions 43. This ensures that all depressions 43 are filled with a high viscous fluid sufficiently.

The pressure generating mechanism 23 is thus composed of the rotor 41 received in the space section 40, the depressions 43, inclined surfaces 43a, the holes 50 and the high viscous fluid 45.

An end cover 28 is removably attached to the open end of the hollow chamber 26 with a cir-clip 30 for defining a closed fluid chamber 27 between the end cover 28 and the piston 24. The fluid chamber 27 is filled with a lubrication oil of a predetermined volume percent.

Plural outer plates 37 and plural inner plates 38, which constitute the clutch means 25 of a multiple disc type, are disposed in the fluid chamber 27 in alternate fashion, and the outer plates 37 are spline-engaged with the inner peripheral surface of the housing 21, while the inner plates 38 are spline-engaged with a clutch hub 39 secured to the outer peripheral surface of the rotary shaft 22.

Operation of the rotary coupling as constructed above will be described hereinafter.

Figure 10:
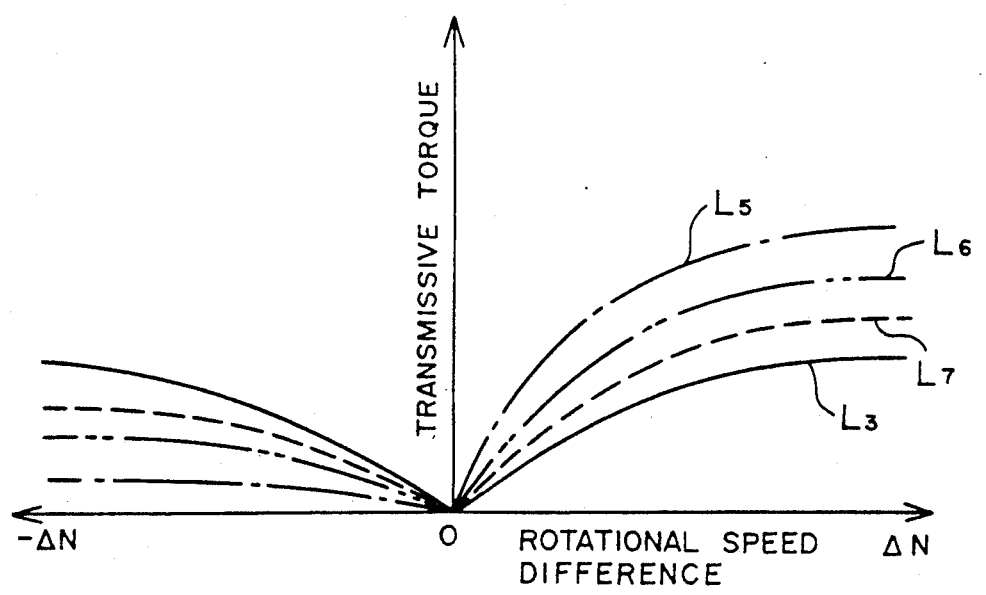
FIG. 10 is a graph which shows relationships between transmissive torque and rotational speed difference when the rotors shown in FIG. 5 through 9 are used, respectively.

When a relative rotation occurs between two shafts 15 and 16, the rotor rotates relative to the housing 21 and the piston 24, and the high viscous fluid 45 is compulsorily moved in the space section 40. Under such circumstance wedge effects occur between the inclined bottom surfaces 43a and the bottom surface of the housing 21, and between the inclined bottom surfaces 43a and the piston 24 so that a high pressure is generated in the space section 40 when the high viscous fluid 45 is moved by the rotor 41. Since a plurality of depressions 43 are formed at both side of the rotor 41 and a pressure is generated in each of depressions 43 in response to the differential rotation, the generation of the pressure occurs quickly. The torque is thus transmitted between the shafts 15 and 16 quickly, as illustrated by a graph L3 in FIG. 10. Accordingly, it is possible to generate a high pressure efficiently and quickly in the pressure generating mechanism 23 which receives the rotor 41 having the depressions 43.

Figure 7:
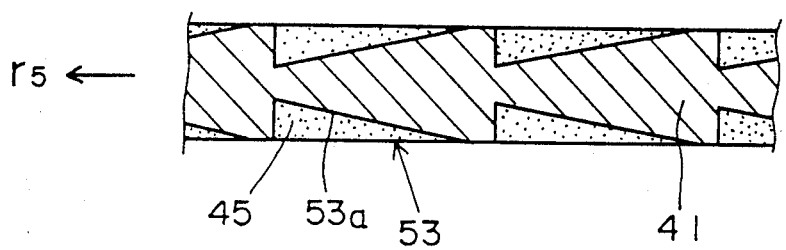
FIG. 7 is a sectional view of the rotor illustrating a first modification of the depressions.

Referring now to FIG. 7, there is a first modified embodiment according to the present invention wherein the rotor 41 is provided with the depressions 53, whose inclined surfaces 53a face the forward rotational direction. When a rotational speed difference occurs between the first and second shafts, and the rotor 41 rotates in the forward direction (It is shown as r5 in FIG. 7), a high pressure is generated in the space section 40 by the wedge effects. On the contrary, when the rotor 41 rotates in a reverse direction, a low pressure is generated in the space section 40. Accordingly, the transmissive torque changes depend on the rotational direction of the rotor 41 as indicated by a graph L5 in FIG. 10.

Figure 8:
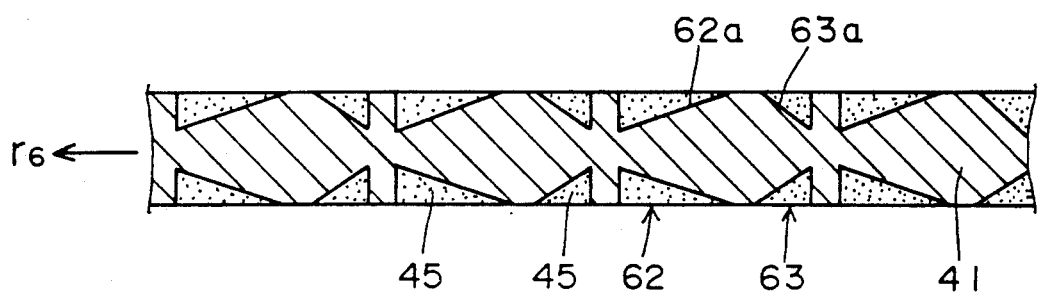
FIG. 8 is a sectional view of the rotor illustrating a second modification of the depressions.

The rotor 41 illustrated in FIG. 8 is a second modified embodiment which is provided with the depressions 62 and 63, the inclined surface 62a and 63b thereof having different length in the circumferential direction and different gradient angles. So different pressures are generated in the depressions 62 and 63 by the wedge effects. As a result the transmissive torque changes as indicated by a graph L6 in FIG. 10.

Figure 9:
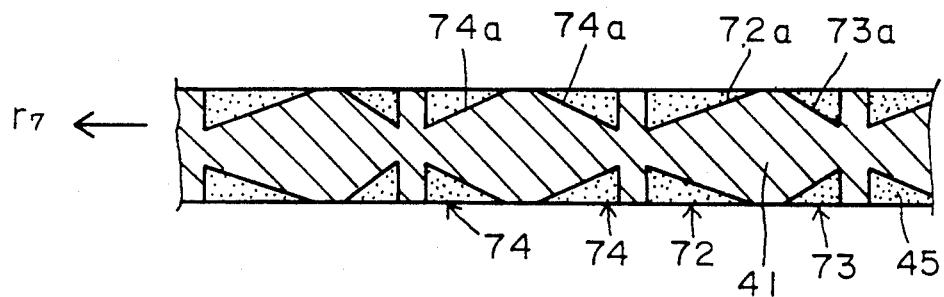
FIG. 9 is a sectional view of the rotor illustrating a third modification of the depressions.

The rotor 41 illustrated in FIG. 9 is a third modified embodiment which is provided with two types of depressions. The first type of depressions 72 and 73 have inclined surfaces 72a and 73a whose gradient angles are different from each other. The second type of depressions 74 and 74 have inclined surfaces 74a and 74a whose gradient angles are the same. The above-described two types of depressions are arranged in the circumferential direction of the rotor 41 in alternate fashion, whereby the transmissive torque changes as indicated by a graph L7 in the FIG. 10.

Figure 11:
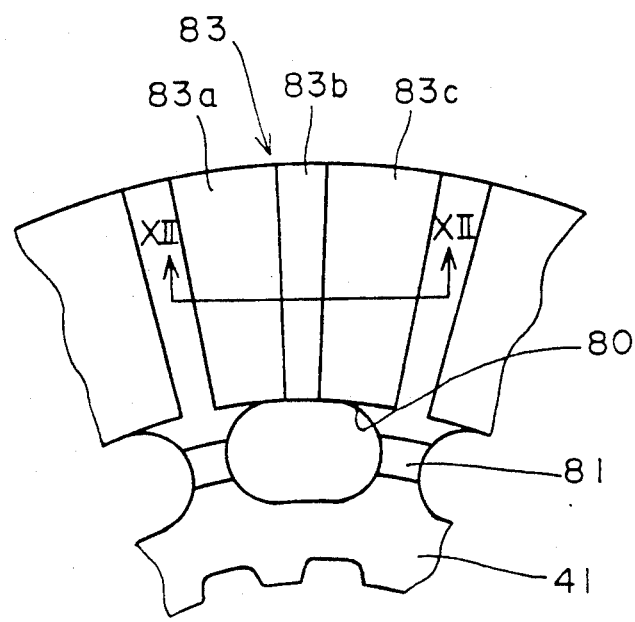
FIG. 11 is a fourth modification of the depressions of the rotor.
Figure 12:
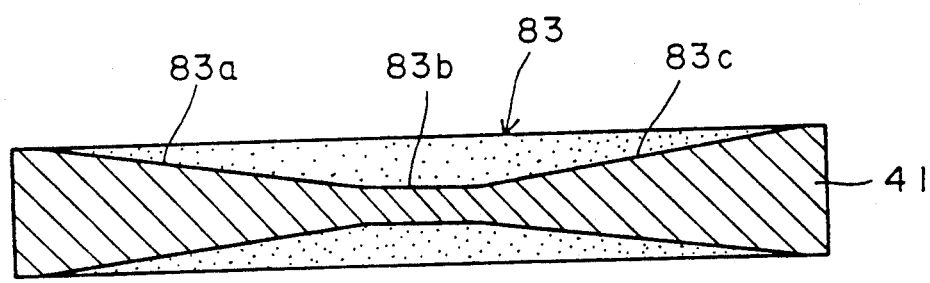
FIG. 12 is a sectional view taken along line XII—XII in FIG. 11.

The rotor 41 illustrated in FIG. 11 is a fourth modified embodiment which is provided with a plurality of depressions 83 each of which comprises a flat bottom surface 83b and inclined surfaces 83a and 83c. The inclined surfaces 83a and 83c, whose gradient angles are the same each other, incline toward the flat bottom surface 83b arranged at the center portions of each depression. The rotor 41 is also provided with a plurality of holes 80 which are adjacent to the above-described depressions 83, the holes 80 being connected through grooves 81.

Figure 13:
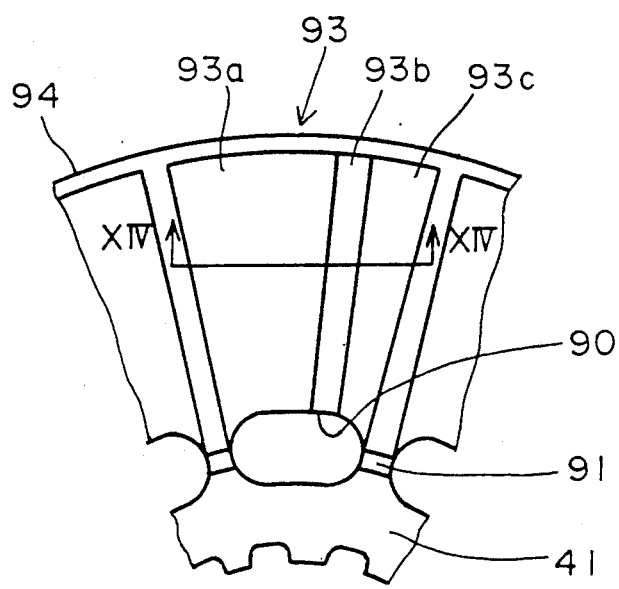
FIG. 13 is a fifth modification of the depressions of the rotor.
Figure 14:
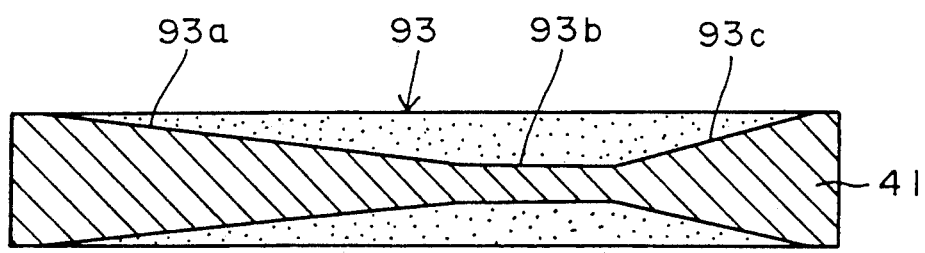
FIG. 14 is a sectional view taken along line XIV—XIV in FIG. 13.

The rotor 41 illustrated in FIG. 13 is a fifth modified embodiment which is provided with a plurality of depressions 93 each of which comprises a flat bottom surface 93b and a pair of inclined surfaces 93a and 93c. The inclined surfaces 93a and 93c, whose widths and gradient angles are different from each other, incline toward the flat bottom surface 93b arranged at a location offset from the center portion of each depression. The rotor 41 is also provided with a plurality of holes 90 which are adjacent to the depressions 93, the holes 90 being connected through grooves 91. Further, the rotor 41 is provided with an edge portion 94 for preventing the high viscous fluid in the depressions 93 from flowing out therefrom.

It is to be noted that a torque transmission characteristic which changes depend on the rotational direction of the rotor can also be obtained by making the length of one of two adjacent inclined surfaces in the circumferential direction differ from that of the other without changing gradient angles thereof.

Although both side surfaces of the rotor are provided plural depressions in the above-mentioned embodiments, the depressions may be formed in only one side surface of the rotor.

Obviously, numerous modifications and variations of the present invention are possible in light of the above teachings. It is therefore to be understood that within the scope of the appended claims, the present invention may be practiced otherwise than as specifically described herein.

What is claimed is:

1. A rotary coupling for torque transmission between first and second shafts comprising:
    a housing coaxially arranged between said first and second shafts and connected to said first shaft;
    clutch means received in said housing for transmitting rotational torque between said housing and said second shaft;
    a piston axially slidably received in said housing for thrusting said clutch means, said piston and said housing defining a cylindrical space;
    a rotor received in said cylindrical space and coupled to said second shaft for rotational movement therewith; and
    a high viscous fluid filled in said cylindrical space to be displaced by said rotor to generate a pressure for pushing said piston toward said clutch means;
    a plurality of circumferentially separated depressions which are formed in at least one side surface of said rotor facing said housing or said piston, each of said depressions having at least one inclined surface inclining so as to increase the depth of the depressions in the rotational direction of said rotor; and
    a plurality of holes in said rotor, said holes being separated in the circumferential direction and located between said depressions and the rotational axis of said rotor.

2. A rotary coupling for torque transmission as set forth in claim 1, wherein:
    each of said depressions has a single inclined surface, and one of every two adjacent inclined surfaces faces a forward rotational direction of said rotor while the other of said two inclined surfaces faces a reverse rotational direction of said rotor.

3. A rotary coupling for torque transmission as set forth in claim 2, wherein:
    both of said two adjacent inclined surfaces have the same length in the circumferential direction and the same gradient angle.

4. A rotary coupling for torque transmission as set forth in claim 2, wherein:
    one of said two adjacent inclined surfaces has a length and a gradient angle different from those of the other of said two adjacent inclined surface.

5. A rotary coupling for torque transmission as set forth in claim 1, wherein:
    all of said inclined surfaces face a forward rotational direction of said rotor.

6. A rotary coupling for torque transmission as set forth in claim 1, wherein:
    each of said depressions is formed with a flat bottom surface and a pair of inclined surfaces formed at both sides of said bottom surface in the circumferential direction of said rotor, and wherein one of said inclined surfaces faces in a forward rotational direction of said rotor while the other thereof faces a reverse rotational direction of said rotor.

7. A rotary coupling for torque transmission as set forth in claim 6, wherein:

said bottom surface is formed at the center of said depression in the circumferential direction of said rotor, and both of said inclined surfaces have the same length in the circumferential direction and the same gradient angle.

8. A rotary coupling for torque transmission as set forth in claim 6, wherein:
said bottom surfaces is formed at a location offset from the center of said depression in the circumferential direction of said rotor, one of said inclined surfaces has a length in the circumferential direction and a gradient angle different from those of the other of said inclined surfaces.

9. A rotary coupling for torque transmission between first and second shafts comprising:
a housing coaxially arranged between said first and second shafts and connected to said first shaft;
clutch means received in said housing for transmitting rotational torque between said housing and said second shaft;
a piston axially slidably received in said housing for thrusting said clutch means, said piston and said housing defining a cylindrical space;
a rotor received in said cylindrical space and coupled to said second shaft for rotational movement therewith;
a high viscous fluid filled in said cylindrical space to be displaced by said rotor to generate a pressure for pushing said piston toward said clutch means; and
a plurality of circumferentially separated depressions formed in at least one side surface of said rotor facing said housing or said piston, each of said depressions having an inclined surface inclining so as to increase the depth of the depressions in the rotational direction of said rotor;
wherein all of said inclined surfaces face a forward rotational direction of said rotor.

10. A rotary coupling for torque transmission between first and second shafts comprising:
a housing coaxially arranged between said first and second shafts and connected to said first shaft;
clutch means received in said housing for transmitting rotational torque between said housing and said second shaft;
a piston axially slidably received in said housing for thrusting said clutch means, said piston and said housing defining a cylindrical space;
a rotor received in said cylindrical space and coupled to said second shaft for rotational movement therewith;
a high viscous fluid filled in said cylindrical space to be displaced by said rotor to generate a pressure for pushing said piston toward said clutch means; and
a plurality of circumferentially separated depressions formed in at least one side surface facing said housing or said piston, each of said depressions having an inclined surface inclining so as to increase the depth of the depressions in the rotational direction of said rotor;
wherein one of every adjacent two of said inclined surfaces has a length and a gradient angle different from those of the other of said adjacent two inclined surfaces.

11. A rotary coupling for torque transmission between first and second shafts comprising:
a housing coaxially arranged between said first and second shafts and connected to said first shaft;
clutch means received in said housing for transmitting rotational torque between said housing and said second shaft;
a piston axially slidably received in said housing for thrusting said clutch means, said piston and said housing defining a cylindrical space;
a rotor received in said cylindrical space and coupled to said second shaft for rotational movement therewith;
a high viscous fluid filled in said cylindrical space to be displayed by said rotor to generate a pressure for pushing said piston toward said clutch means; and
a plurality of circumferentially separated depressions which are formed in at least one side surface of the rotor facing said housing or said piston;
wherein each of said depression is formed with a pair of inclined surfaces, one of said inclined surfaces facing a forward rotational direction of said rotor and having a predetermined length in the circumferential direction and a predetermined gradient angle, and the other thereof facing a reverse rotational direction of said rotor and having a length and a gradient angle different from those of the one of said inclined surfaces.

* * * * *